(12) United States Patent
Williams et al.

(10) Patent No.: US 12,020,357 B2
(45) Date of Patent: Jun. 25, 2024

(54) AUGMENTATION OF DIGITAL IMAGES WITH SIMULATED SURFACE COATINGS

(71) Applicant: SWIMC LLC, Cleveland, OH (US)

(72) Inventors: Preston Williams, Bay Village, OH (US); Brendan Do, North Ridgeville, OH (US); Daniel Cody Richmond, North Ridgeville, OH (US); Michael Dowell, Aurora, OH (US)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 17/768,139

(22) PCT Filed: Oct. 9, 2020

(86) PCT No.: PCT/US2020/054939
§ 371 (c)(1),
(2) Date: Apr. 11, 2022

(87) PCT Pub. No.: WO2021/072162
PCT Pub. Date: Apr. 15, 2021

(65) Prior Publication Data
US 2022/0414952 A1    Dec. 29, 2022

Related U.S. Application Data

(60) Provisional application No. 62/914,087, filed on Oct. 11, 2019.

(51) Int. Cl.
*G06T 11/60* (2006.01)
*G06Q 30/0601* (2023.01)
(Continued)

(52) U.S. Cl.
CPC .......... *G06T 11/60* (2013.01); *G06Q 30/0631* (2013.01); *G06T 7/10* (2017.01);
(Continued)

(58) Field of Classification Search
CPC ... G06T 11/60; G06T 7/10; G06T 7/13; G06T 7/90; G06T 11/001; G06T 2200/24;
(Continued)

(56) References Cited

U.S. PATENT DOCUMENTS 10,475,250 B1 * 11/2019 Huang ............... G06Q 30/0643
2019/0035125 A1    1/2019 Bellows et al.
2019/0122404 A1 *  4/2019 Freeman ................ G06V 10/56

FOREIGN PATENT DOCUMENTS

EP    2512141 A1    10/2012
EP    3423990 A1     1/2019
(Continued)

OTHER PUBLICATIONS

Boykov et al., "Graph Cuts and Efficient N-D Image Segmentation", International Journal of Computer Vision, vol. 70, No. 2, Nov. 2006, pp. 109-131.
(Continued)

*Primary Examiner* — Said Broome
*Assistant Examiner* — Andrew Shin
(74) *Attorney, Agent, or Firm* — Shumaker & Sieffert, P.A.

(57) ABSTRACT

An image augmentation system and method for simulating the application of a coating to a surface of an original image. A mask generator can perform a search to detect a recognized object depicted in the original image, and generate a object mask for the recognized object. A user interface can to receive an identification of a selected object and an identification of a selected coating to be simulated on the selected object, and display a painted image. A renderer can receive the object mask for the selected object and the selected coating and generate the painted image, each pixel
(Continued)

of the painted image having a painted color determined based on the object mask, the coating, and the original image.

14 Claims, 19 Drawing Sheets

(51) Int. Cl.
| | |
|---|---|
| *G06T 7/10* | (2017.01) |
| *G06T 7/13* | (2017.01) |
| *G06T 7/90* | (2017.01) |
| *G06T 11/00* | (2006.01) |
| *G06V 10/44* | (2022.01) |
| *G06V 10/764* | (2022.01) |
| *G06V 10/82* | (2022.01) |
| *G06V 20/00* | (2022.01) |
| *G06V 20/50* | (2022.01) |

(52) U.S. Cl.
CPC ............... *G06T 7/13* (2017.01); *G06T 7/90* (2017.01); *G06T 11/001* (2013.01); *G06V 10/44* (2022.01); *G06V 10/764* (2022.01); *G06V 10/82* (2022.01); *G06V 20/00* (2022.01); *G06V 20/50* (2022.01); *G06T 2200/24* (2013.01)

(58) Field of Classification Search
CPC .. G06Q 30/0631; G06V 10/44; G06V 10/764; G06V 10/82; G06V 20/00; G06V 20/50; G06F 18/24133
See application file for complete search history.

(56) References Cited

FOREIGN PATENT DOCUMENTS

| | | |
|---|---|---|
| EP | 3479344 A1 | 5/2019 |
| WO | 2017149315 A1 | 9/2017 |
| WO | 2018002533 A1 | 1/2018 |

OTHER PUBLICATIONS

Chen et al., "DeepLab: Semantic Image Segmentation with Deep Convolutional Nets, Atrous Convolution, and Fully Connected CRFs", arXiv:1606.00915v2, May 12, 2017, 14 pp.
He et al., "Deep Residual Learning for Image Recognition", arXiv:1512.03385v1 [cs.CV] Dec. 10, 2015, Dec. 10, 2015, 12 pp.
International Preliminary Report on Patentability from International Application No. PCT/US2020/054939 dated Apr. 12, 2022, 6 pp.
International Search Report and Written Opinion of International Application No. PCT/US2020/054939 dated Feb. 2, 2021, 9 pp.
Krizhevsky et al., "ImageNet Classification with Deep Convolutional Neural Networks", Advances in Neural Information Processing Systems 25 (NIPS 2012), Dec. 3, 2012, 9 pp.
Simonyan et al., "Very Deep Convolutional Networks for Large-Scale Image Recognition", arXiv:1409.1556v6, Apr. 10, 2015, 14 pp.
Szegedy et al., "Going Deeper with Convolutions", 1 arXiv:1409.4842v1, Sep. 17, 2014, 12 pp.
Zhou et al., "Scene Parsing through ADE20K Dataset", 2017 IEEE Conference on Computer Vision and Pattern Recognition (CVPR), Jul. 21, 2017, 9 pp.

\* cited by examiner

```
1:  <img class="image-natural" src="blob:http://localhost:8080/inputimage" alt="">
2:  <svg class="svg-defs-wrapper" x="0" y="0" width="100" height="100" version="1.1"
    xmlns="http://www.w3.org/2000/svg" xmlns:xlink="http://www.w3.org/1999/xlink"
    viewBox="0 0 2400 1600">
3:    <defs>
4:      <filter id="filter_0" x="0" y="0" width="100%" height="100%"
      filterUnits="objectBoundingBox" primitiveUnits="objectBoundingBox" color-
      interpolation-filters="sRGB">
5:        <feFlood flood-color="#7dc1cb" result="selectedCoating"></feFlood>
6:        <feImage xlink:href="data:image/png;base64,iVB..." x="0" y="0" width="100%"
          height="100%" result="lightenedImg"></feImage>
7:        <feImage xlink:href="blob:http://localhost:8080/inputimage" x="0" y="0"
          width="100%" height="100%" result="roomImageZero"></feImage>
8:        <feComposite in="lightenedImage" in2="roomImageZero" operator="over" x="0"
          y="0" width="100%" height="100%" result="roomImage"></feComposite>
9:        <feComposite in="roomImageZero" in2="roomImageZero" operator="over" x="0" y="0"
          width="100%" height="100%" result="roomImage"></feComposite>
10:       <feImage xlink:href="data:image/png;base64,iVBORw0KNSUhEUgAABL..." x="0" y="0"
          width="100%" height="100%" result="desaturationMask"></feImage>
11:       <feColorMatrix in="roomImageZero" type="saturate" values="0"
          result="roomImage"></feColorMatrix>
12:       <feComposite in="roomImage" in2="desaturationMask" operator="in" x="0%" y="0%"
          width="100%" height="100%" result="desatRoomParts"></feComposite>
13:       <feComposite in="desatRoomParts" in2="roomImageZero" operator="over" x="0%"
          y="0%" width="100%" height="100%" result="roomImage"></feComposite>
``` cont'd in FIG. 12B...

FIG. 12A

```
...cont'd from FIG. 12A

14:        <feBlend mode="multiply" in="selectedCoating" in2="roomImage"
           result="roomImage"></feBlend>
15:      </filter>
16:      <mask id="mask_0" x="0" y="0" width="100%" height="100%"
           maskUnits="objectBoundingBox">
17:        <image x="0" y="0" width="100%" height="100%"
           xlink:href="http://localhost/static/files/objectmasks.png"> </image>
18:      </mask>
19:    </defs>
20:  </svg>
21:  <svg class="image-tinted" version="1.1" xmlns="http://www.w3.org/2000/svg"
       viewBox="0 0 2400 1600" preserveAspectRatio="none">
22:    <rect fill="rgba(0,0,0,0)" x="0" y="0" width="100%" height="100%"
         mask="url(#mask_0)" filter="url(#filter_0)"></rect>
22:  </svg>
```

FIG. 12B

AUGMENTATION OF DIGITAL IMAGES WITH SIMULATED SURFACE COATINGS

CROSS-REFERENCE TO RELATED APPLICATIONS

The present application is a National Phase Entry of International Patent Application No. PCT/US2020/054939, filed on Oct. 9, 2020, which claims priority to U.S. Provisional Patent Application No. 62/914,087, filed on Oct. 11, 2019, the disclosures of which are incorporated by reference herein.

TECHNICAL FIELD

Embodiments of the present disclosure relate generally to the field of computer graphics, and more particularly to augmenting digital images to depict the simulated application of coatings.

BACKGROUND

Visual aids can assist purchasers in the selection of paints, stains, or other coatings for application to a surface. One form of visual aid are paint chips, or color swatches, in which the coating has been applied to a physical surface, that can provide a truer sense of what a coating looks like when applied. Such swatches are limited in that they are often small, and aren't applied to the entirety of a surface that the purchaser may wish to cover.

Computers and mobile devices provide the ability to modify digital images. For example, photo editing tools enable regions of pixels can be selected to be recolored, either by filling with a solid, opaque color, or by using one or more translucent overlays. In order to realistically portray how a coating might look on a given surface using a photo editing tool, a number of manual techniques are required to select the appropriate pixels and apply coloration while maintaining areas of shadow, highlight, or other factors that affect how a pixel of a surface should be colored.

The field of augmented reality has developed a number of techniques for automatically augmenting a displayed image to, for example, depict objects that don't exist in the physical scene, or to alter the appearance of existing objects with one or more overlays. Such systems often rely on edge detection or other techniques known in the art to identify regions of similar colors that can be assumed to make up a continuous surface. These systems often struggle to determine the pixel boundaries of objects or surfaces when one or more intervening objects partially block the view.

A need exists, therefore, for improved systems and methods to modify images to simulate the application of a coating to a surface depicted in a digital image.

SUMMARY

Embodiments of the present disclosure address the need for improved systems and methods to modify images to simulate the application of a coatings to a surface depicted in a digital image.

In an embodiment, an image augmentation system for simulating the application of a coating to a surface of an original image comprising a plurality of original pixels can comprise at least one memory and at least one processor configured to implement a mask generator configured to receive the original image, perform a search to detect a recognized object depicted in the original image, and generate a object mask for the recognized object comprising a mask pixel corresponding to each of the plurality of original pixels, at least one parameter of each mask pixel having a first value if the corresponding original pixel is part of the recognized object and a second value if the corresponding original pixel is not part of the recognized object, a user interface configured to receive an identification of a selected object and an identification of a selected coating to be simulated on the selected object, and display a painted image, and a renderer configured to receive the object mask for the selected object and the selected coating and to generate the painted image, each pixel of the painted image having a painted color, the painted color determined to be the same color as the corresponding pixel of the original image if the corresponding mask pixel has the second value, and determined based on the coating and the corresponding original pixel if the corresponding mask pixel has the first value.

In embodiments, the mask generator comprises a class recognizer configured to identify a class of object present in an area of the original image. In embodiments, the mask generator further comprises an image segmenter for each of a plurality of classes configured to detect a recognized object by identifying the pixels of the original image that include the recognized object. The class recognizer and the image segmenter can each comprise a neural network.

In embodiments, the painted color is further determined based on at least one tint plane adjustment map defining a difference between a base color and the color of the corresponding original pixel. The difference between the base color and the color of the corresponding original pixel can be based on at least one of the hue, the saturation, and/or the luminosity of the base color and the color of the corresponding original pixel.

In embodiments the coating and the at least one tint plane adjustment map can comprise filter primitives, and the renderer can be configured to generate the painted image by applying the filter primitives to the original image.

In embodiments, an method for simulating the application of a coating to a surface of an original image comprising a plurality of original pixels can include receiving an original image file, performing a search to detect a recognized object depicted in the original image, generating an object mask for the recognized object comprising a mask pixel corresponding to each of the plurality of original pixels, at least one parameter of each mask pixel having a first value if the corresponding original pixel is part of the recognized object and a second value if the corresponding original pixel is not part of the recognized object, displaying, on a user interface device, a first painted image depicting the original image and a selectable area corresponding to each recognized object, receiving, from the user interface device, a user selection of a selected object and a coating, rendering a painted image, each pixel of the painted image having a painted color determined to be the same color as the corresponding pixel of the original image if the corresponding mask pixel has the second value, and determined based on the coating and the corresponding original pixel if the corresponding mask pixel has the first value.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

BRIEF DESCRIPTION OF THE DRAWINGS

Subject matter hereof may be more completely understood in consideration of the following detailed description of various embodiments in connection with the accompanying figures.

FIG. 12A is a code listing depicting a partial HTML, document, according to an embodiment.

FIG. 12B is a code listing depicting a partial HTML document, according to an embodiment.

Figure 1:
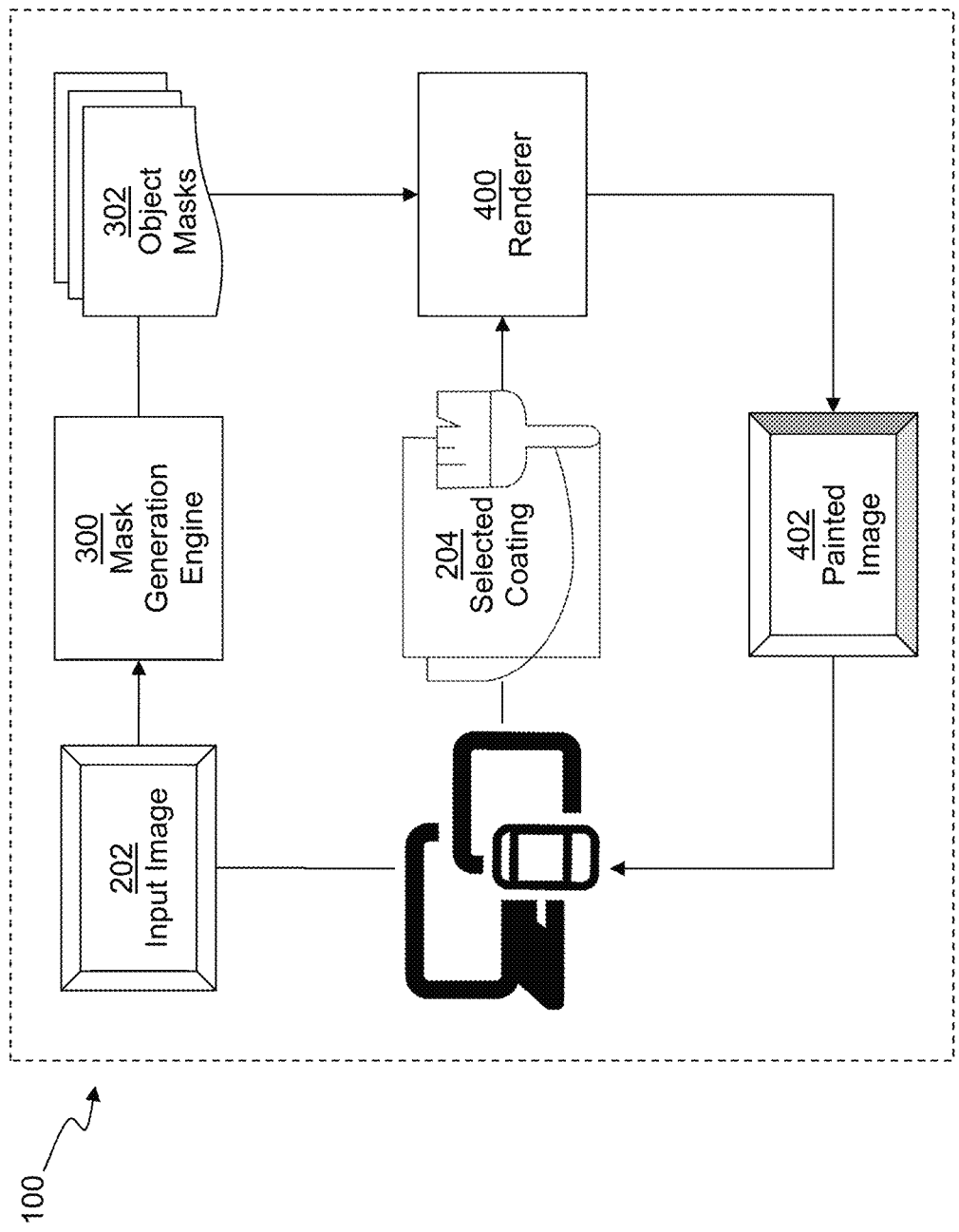
FIG. 1 is a schematic diagram depicting an image augmentation system, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

FIG. 1 depicts a system 100 for augmenting an input image to depict a simulated coating applied to a surface in the input image. System 100 can comprise user interface 200, mask generator 300, and renderer 400.

User interface 200 can comprise a mobile application, web-based application, or any other executable application framework. User interface 200 can reside on, be presented on, or be accessed by any computing devices capable of communicating with the various components of system 100, receiving user input, and presenting output to the user. In embodiments, user interface 200 can reside or be presented on a smartphone, a tablet computer, laptop computer, or desktop computer.

FIGS. 2A-2F depict example screens that can be provided by user interface 200 to present output to, and receive input from, a user according to an embodiment. Each screen of user interface 200 can present controls or other interfaces enabling the user to request one or more actions from system 100. The operation of system 100 with respect to the screens depicted in FIGS. 2A-2F is provided in further detail herein. While FIGS. 2A-2F are depicted, embodiments of system 100 can provide more, fewer, or alternative screens.

Figure 2A:
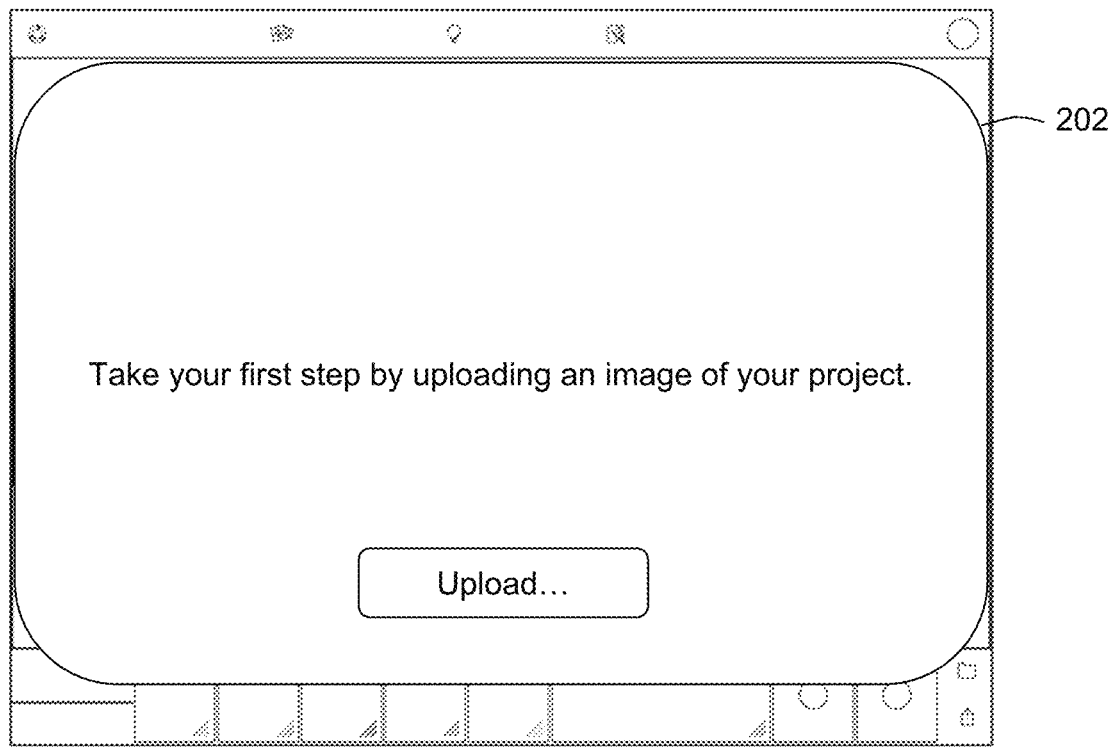
FIGS. 2A-2F are mockups depicting example user interface screens of an image augmentation application, according to an embodiment.
Figure 2B:
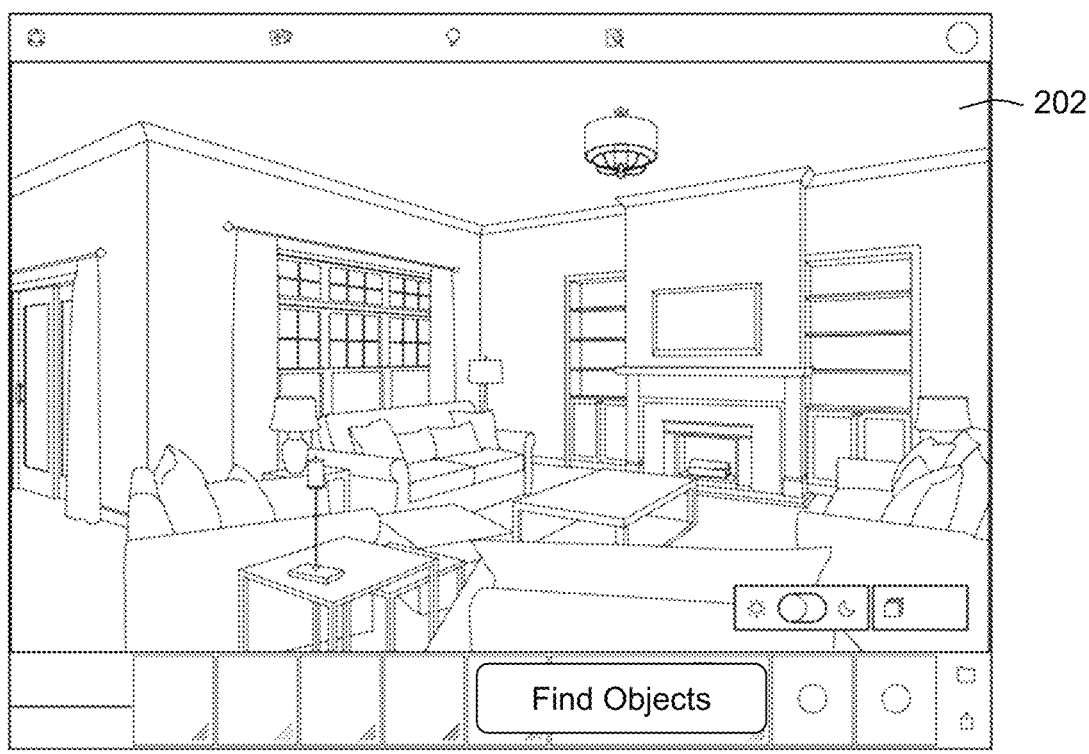

As depicted in FIG. 2A, the user can be prompted to select or upload an original, or input, image 202 from a memory. User interface 200 can further enable the user to control an image capture device such as a camera connected or integrated into a computing device to capture an image on demand. As depicted in FIG. 2B, input image 202 can be displayed, and the user can be prompted to request that objects be automatically recognized. In alternative embodiments, object recognition can begin without waiting for user input.

Figure 2C:
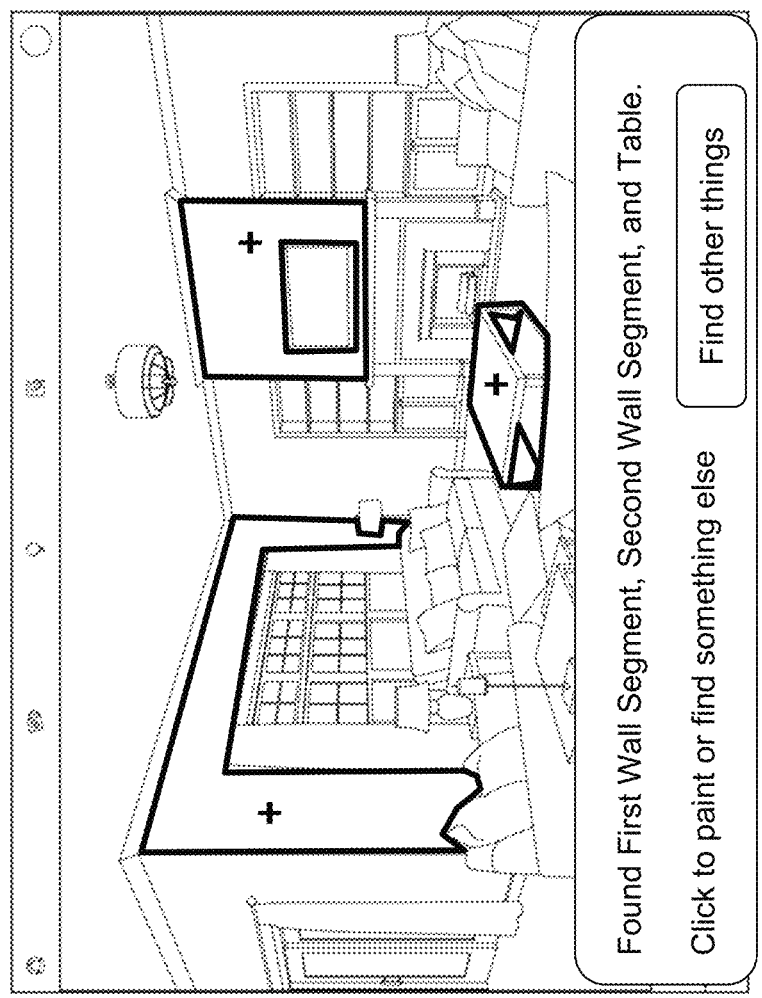
Figure 2D:
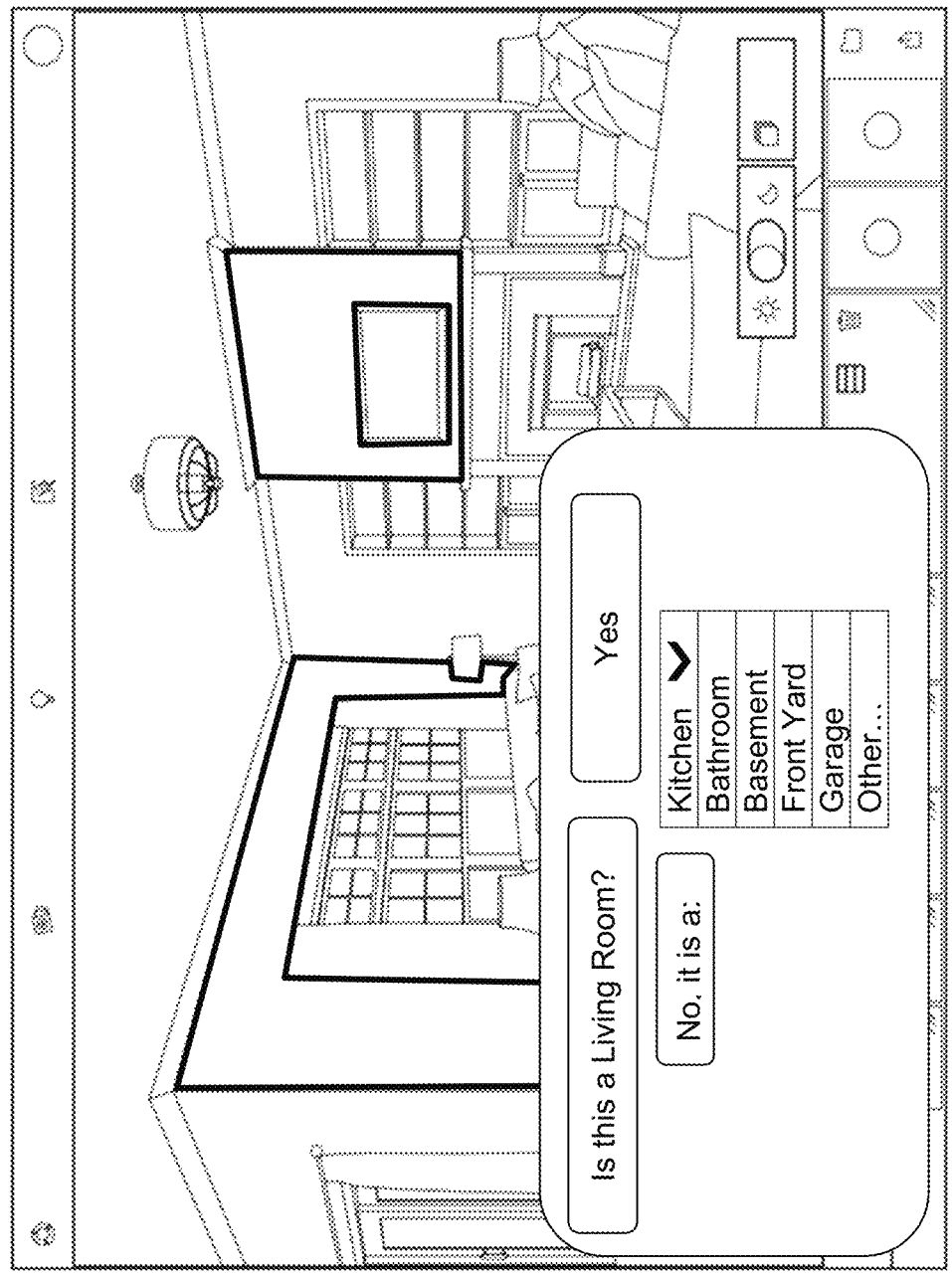
Figure 2E:
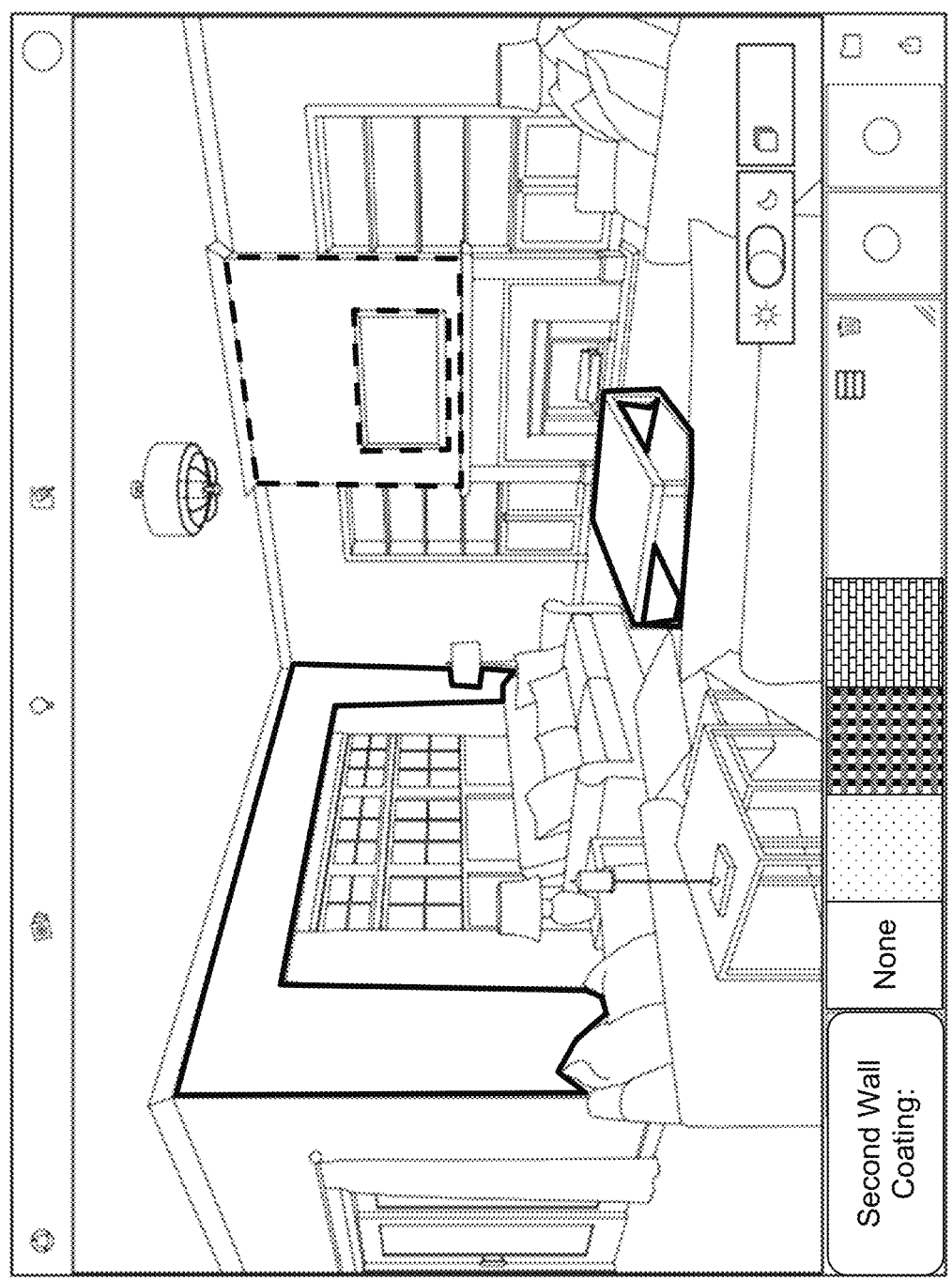
Figure 2F:
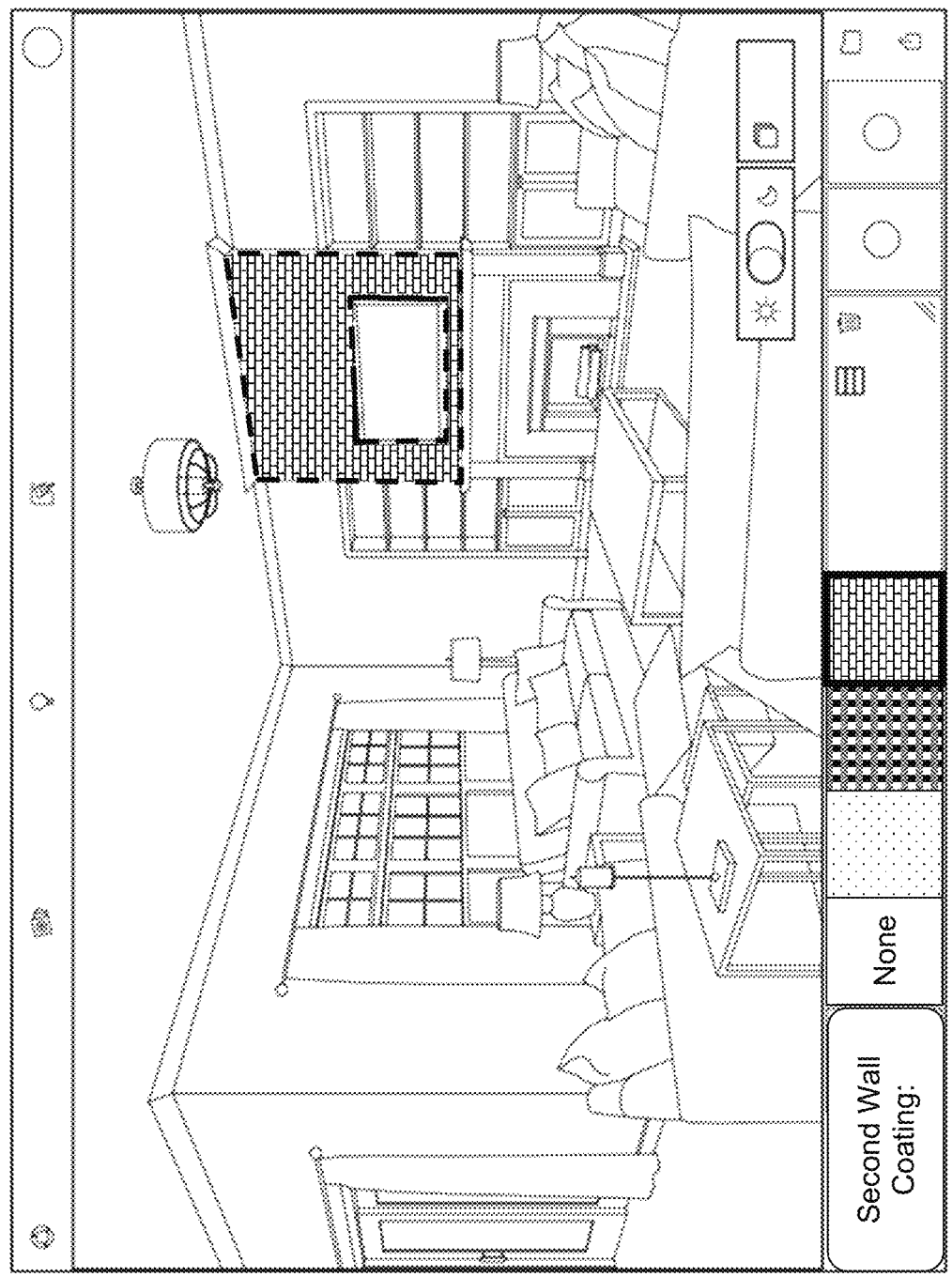

As depicted in FIG. 2C, a screen can be provided that identifies objects recognized in input image 202 and requests user feedback. If the user does not want to click one of the recognized objects, a screen such as that depicted in FIG. 2D can request confirmation that depicted scene is correctly identified. FIG. 2E depicts an example screen enabling the user to choose a selected coating 204 for application on a recognized objected. FIG. 2F depicts an example screen depicting painted image 402, which has been modified to depict the selected coating.

Referring again to FIG. 1, input image 202 can comprise a digital image in any image file format known in the art, such as bitmap (BMP), raw, graphics interchange format (GIF), joint photographic experts group (JPEG, or JPG), portable network graphics (PNG), or the like. Input image 202 can further comprise a single frame or image from a sequences of images such as animated GIF files, or video formats such as moving picture experts group (MPEG, or MP4), audio video interleave (AVI), or the like. While input image 202 and other image data described herein can include vector graphics data, the data structure of input image 202 and other images will be described, conceptually, herein as a two-dimensional array of pixels.

Pixels within an image file can each comprise one or more parameters defining the visual appearance of the pixel when output to a display, a printer, or other image viewer. Pixel parameters can comprise color information in red/green/blue (RGB), hue/saturation/value (HSV), cyan/magenta/yellow/black (CMYK), or other computer-comprisable color definition formats, as well as transparency parameters such as an alpha value.

Figure 3:
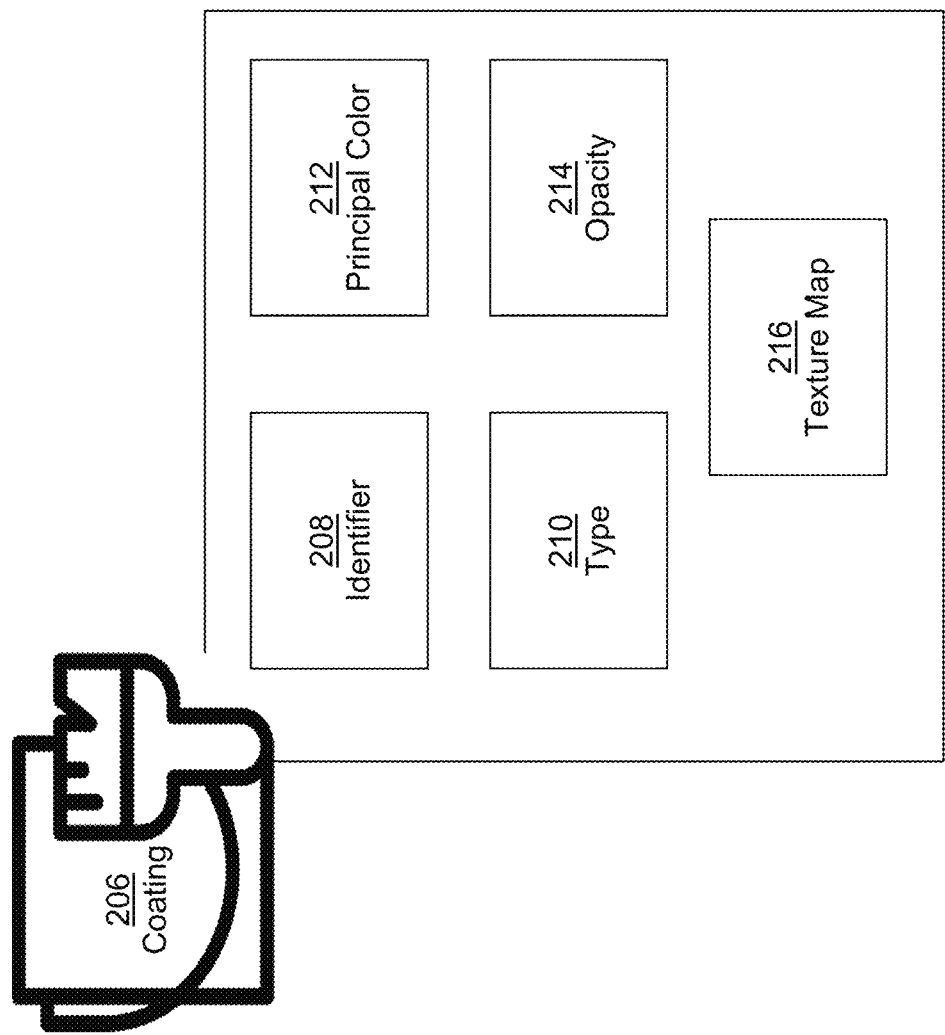
FIG. 3 is a schematic diagram depicting the data structure of a coating, according to an embodiment.

Referring now to FIG. 3, selected coating 204 can be one of a plurality of coatings 206 provided by system 100. Each coating 206 can represent a paint, stain, texture, or other item or surface treatment, for simulated application by embodiments of the present disclosure. According to an embodiment, each coating 206 can be presented by a data structure comprising an identifier 208, a type 210, a principal color 212, opacity information 214, and a texture map 216. In embodiments, identifier 208 can be a model or product number or name, or can be associated with a standard color scheme such as the PANTONE color scheme. Type 210 can indicate a category or style of coating represented. For example, types can include "paint," "stain," or "texture." Embodiments can further support subtypes such as "gloss paint," "matte paint," "opaque stain," "translucent stain," or the like.

Principal color 212 can be the main color of a coating that may have multiple pigment colors, or may take on multiple colors based on the surface substrate. For example, for coatings of type "paint," the principal may comprise color information that is based on the color of the main pigment in the coating.

Opacity information 214 of a coating can be a single value, for example, 100% for opaque paints and stains, or can comprise image data with each pixel having varying alpha or other values to indicate uneven transparency. Texture map 216 can comprise image data with each pixel having a parameter value determined based on high or low points in the texture of the coating 206. The image data for opacity 214, and texture map 216, if present, can comprise tileable images, such that the image data can be repeated across a region of pixels in the painted image 402.

The data representing coatings 206 can be stored in a memory or data store of system 100. In embodiments, coatings 206 can correspond with one or more existing or proposed products, and the data regarding coatings 206 can be retrieved from a product information system included within, or remote from, system 100. Coatings can further comprise, or be convertible to, scalable vector graphics (SVG) filter primitives.

Figure 4:
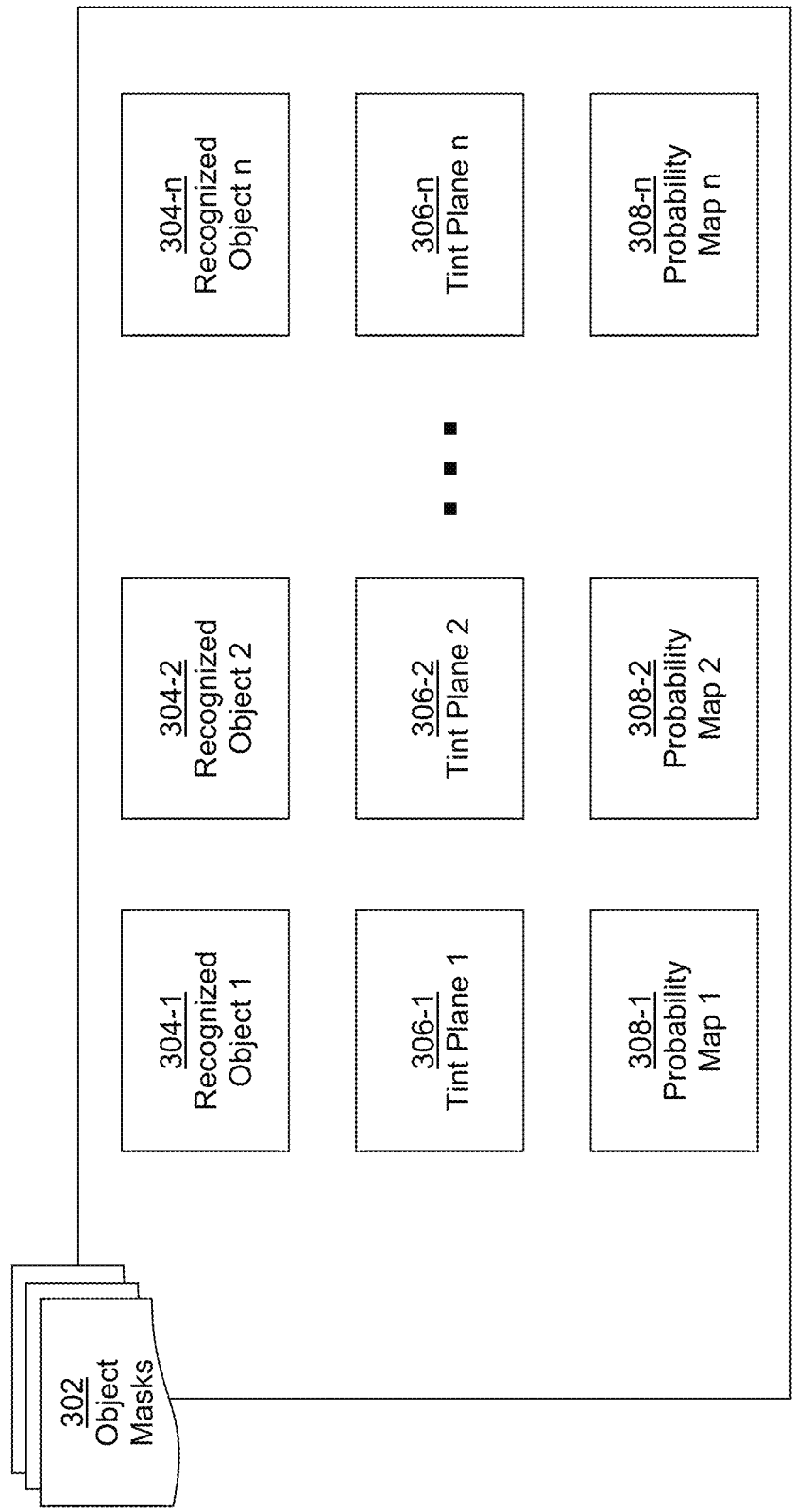
FIG. 4 is a schematic diagram depicting object masks, according to an embodiment.

Mask generator 300 can receive input image 202 and generate one or more object masks 302. As depicted in FIG. 4, each object mask 302 can be associated with a recognized object 304, and include a tint plane mask image 306 (or simply, tint plane 306) and a probability map 308. Objects masks 302 can define the pixels of input image 202 that depict a paintable, or tintable surface within input image 202. Each recognized object 304 can be an entire object (such as a table), or an individual surface of an object (such as the top of a table).

Figure 5:
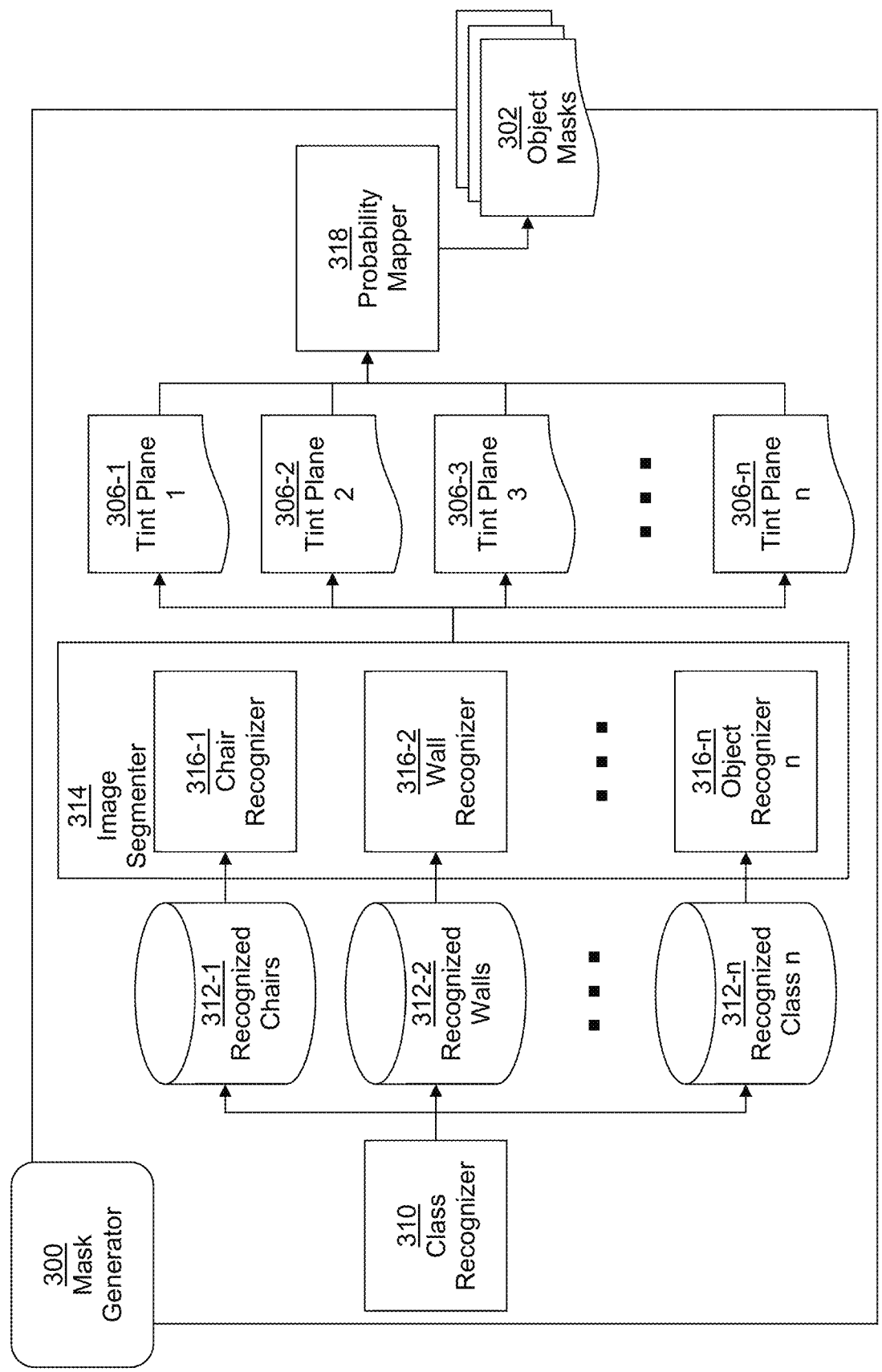
FIG. 5 is a schematic diagram depicting components of a mask generator, according to an embodiment.

FIG. 5 is a schematic view depicting components of mask generator 300. Class recognizer 310 can comprise a classifier that has been trained to identify areas of an image that depict an object in one or more classes of common objects. In embodiments, class recognizer 310 can be trained to identify classes of objects such as interior and exterior architectural surfaces, including walls, floors, ceilings, and wall/ceiling trim and molding; architectural scenes, such as living room, kitchen, bedroom, bathroom, entryway, office, recreation room, garage, front exterior, and rear exterior; kitchen and bathroom cabinets of all type; common forms of furniture, including tables of all type, chairs of all type, desks, armoires, wardrobes, sideboards, bookcases, benches, entertainment centers, consoles, and chests of drawers, and the like.

Class recognizer 310 can return a recognized class 312 data structure for each object class detected in the original image. Each recognized class 312 can comprise an identifier of the class, and, in embodiments, coordinates locating where the class was identified within the image. The coordinates can be pixel coordinates defining a bounding box. For example, a tuple of (x, y, width, height) can represent the x and y coordinates for the top left corner of a bounding box, and the width and height can define the extent of the bounding box. The coordinates can also be a more detailed representation of the perimeter of the area where the object class was recognized. In other embodiments, the identifier of the class can be provided without additional coordinate or location information.

In embodiments, class recognizer 310 can also deduce one or more insights regarding the depicted scene, for example, class recognizer 310 may determine that an input image that includes objects of certain classes (for example a sink, a refrigerator, and a dishwasher), that the scene depicts a kitchen. In another example, if a driveway object, a front door object, and one or more window objects are detected, class recognizer 310 may determine that an outdoor view of the front of a house is depicted. In embodiments, the type of scene can be used to narrow the potential classes searched for recognized objects. For example, if a region of the image is recognized as both a "bed" and a "sofa," but other classes within the image indicate that the scene depicts a bedroom, the recognized class 312 indicating that a region depicts a bed may be given additional weight.

Image segmenter 314 can comprise a plurality of object classifiers 316 each trained to identify the boundaries of objects of a particular class. For example, image segmenter 314 can comprise an interior wall recognizer, a sofa recognizer, an entertainment center recognizer, and/or the like. Image segmenter 314 can receive each recognized class 312 and generate a tint plane mask image 306 for each recognized object 304. If more than one recognized object 304 is found, the tint plane mask image 306 can be created in a predetermined order of priority (for examples, walls, followed by ceilings, followed by trim, followed by furniture, etc.). Each object classifier 316 can search the coordinate space identified by recognized class 312 for an object of the associated type without having to search the entire image. Because class recognizer 310 can operate at a less detailed level before object classifiers 316 perform more precise identification and location of objects, mask generator 300 can have improved efficiency and accuracy compared to systems that are trained only to recognize specific objects across an entire image.

Each of class recognizer 310 and the plurality of recognizers of image segmenter 314 can comprise a neural network, or other deep learning network such as a based on a deep learning network such as a convolutional neural network (CNN). Each neural network can be implemented as a TensorFlow model, and can comprise a neural network with an architecture based on or similar to ResNet, AlexNet, GoogLeNet, DeepLab, VGG, or other neural network architecture. TensorFlow is an open source machine learning library published by Google, LLC. ResNet is a residual learning framework described by Kaiming He et al., *Deep Residual Learning for Image Recognition*, ARXIV: 1512.03385 (2015). AlexNet is a convolutional neural network framework described by Alex Krizhevsky et al., *ImageNet Classification with Deep Convolutional Neural Networks*, 25 ADVANCES IN NEURAL INFORMATION PROCESSING SYSTEMS 1097 (2012). GoogLeNet is a convolutional neural network architecture described by Szegedy et al., *Going Deeper with Convolutions*, ARXIV: 1409.4842 (2015). DeepLab is a convolutional neural network framework described by Liang-Chieh Chen et al., *DeepLab: Semantic Image Segmentation with Deep Convolutional Nets, Atrous Convolution, and Fully Connected CRFs*, ARXIV:1606.00915 (2016). VGG is a convolutional neural network framework described by Karen Simonyan et al., *Very Deep Convolutional Networks for Large-Scale Image Recognition*, ARXIV:1409.1556 (2014).

Each neural network be trained using a plurality of labeled training images, and supervised and unsupervised neural network training techniques can be used. For example, deeply annotated training images from the publicly available ADE20K dataset can be used in addition to proprietary training data. The ADE20K dataset is published by the Massachusetts Institute of Technology, and described by Bolei Zhou, et al., *Scene Parsing through ADE20K Dataset*, PROCEEDINGS OF THE IEEE CONFERENCE ON COMPUTER VISION AND PATTERN RECOGNITION, 2017. Training images can be annotated to include labels identifying of parts of objects as well as whole objects.

Probability mapper 318 can receive each tint plane mask image 306 and a generate probability map 308 for each recognized object 304. Probability map 308 can comprise image data and each pixel in the probability map 308 can correspond to a pixel in input image 202. Probability map 308 can be represented in memory as a one-dimensional array, with every pixel of the source image represented with a single integer value 0-99. Pixels in probability map 308 can be ordered in the same way that image data is returned from an image processing API, such as the hypertext markup language 5 (HTML5) Canvas API's getImageData method—right to left and top to bottom, wrapping from the end of each image pixel row to the beginning of the next image pixel row. Probability map 308 can be defined by probability mapper 318, and updated and refined by other components of system 100.

At least one parameter of each probability map pixel (for example, red, green, blue, alpha, or other parameters) can have a probability value based on the confidence that the pixel in the input image is part of the associated recognized object 304. For example, the alpha (or transparency) value for each pixel can have a value of one hundred for pixels that are part of the interior of a recognized object, 1-99 for pixels that are part of an anti-aliased edge of the recognized object, and zero for pixels that are not part of the recognized object.

Embodiments of mask generator 300 can correctly identify up to 95% of the pixels that comprise a paintable surface of a depicted object that is represented by at least 1,000 pixels in the input image 202. The number of false positives (pixels incorrectly identified as being part of a paintable surface) can be fewer than 5% of the total number of pixels that actually comprise the surface.

In embodiments, mask generator 300 can receive confirmation from the user at one or more phases of the mask generation process. For example, in one embodiment, mask generator 300 can present the tint planes 306 of the recognized objects 304 to the user by updating the display provided by user interface 200 to display the input image overlaid with graphical elements indicating recognized objects. The boundaries of one or more recognized objects 304 can be presented in a bold or highlighted manner, as depicted in FIG. 5. Further, the user can be presented with object selection controls 320 enabling the user to highlight or identify one or more recognized objects of interest.

Figure 6:
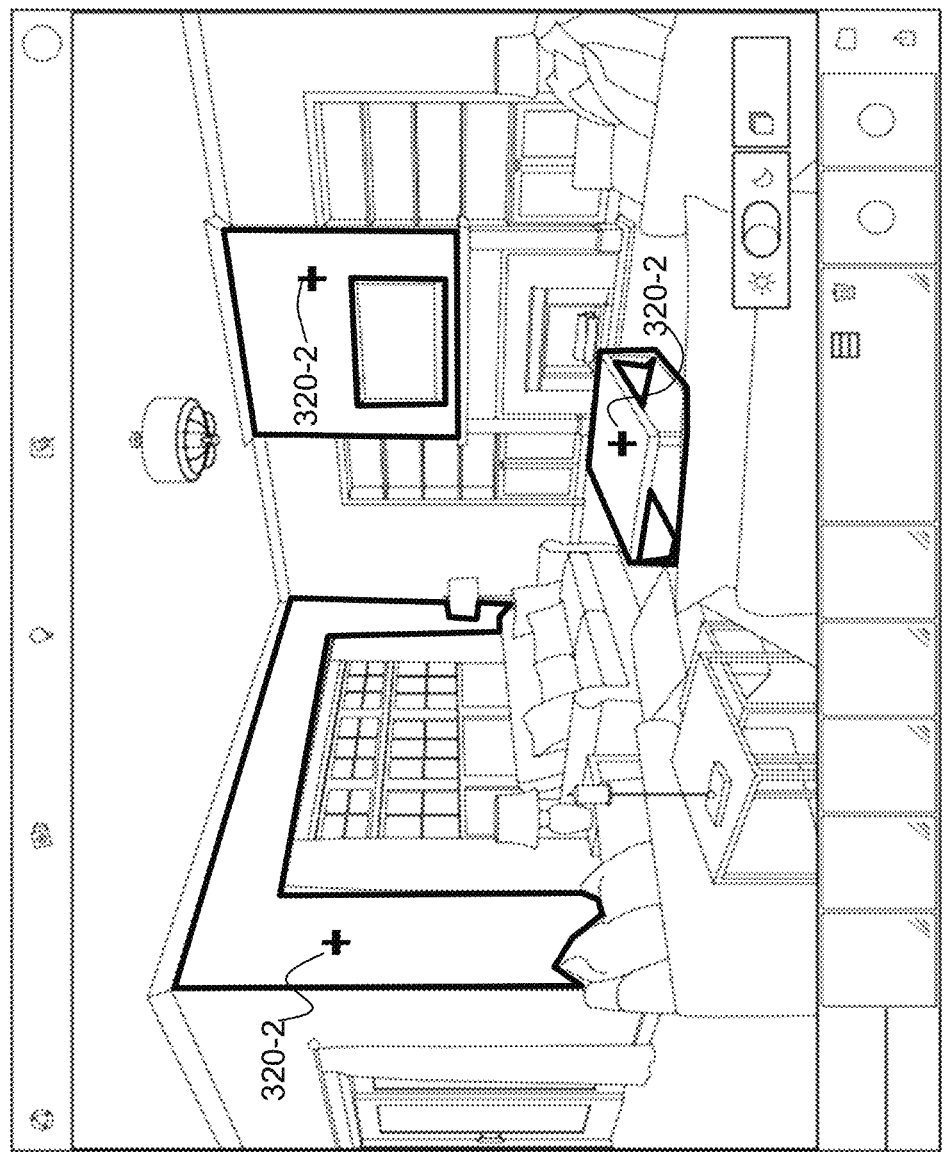
FIG. 6 is a mockup depicting an example user interface screen, according to an embodiment.

As depicted in FIG. 6, object selection control 320-1 is associated with a first wall segment, object selection control 320-2 is associated with a second wall segment, and 320-3 is associated with a coffee table. Each object selection control 320 can enable the use to select the associated recognized object. While mask generator 300 can recognize any number of objects that are depicted in input image 202, only three recognized objects are highlighted in the depiction of FIG. 6 for clarity. User interface 200 can highlight all recognized objects within input image 202, and/or can enable the user to filter based on one or more criteria, such as the size of the recognized object, the type of the recognized object, or whether the recognized object has had a simulated coating applied during the current (or previous) session. Mask generator 300 can wait until receiving user confirmation before the execution of probability mapper 318.

Figure 7:
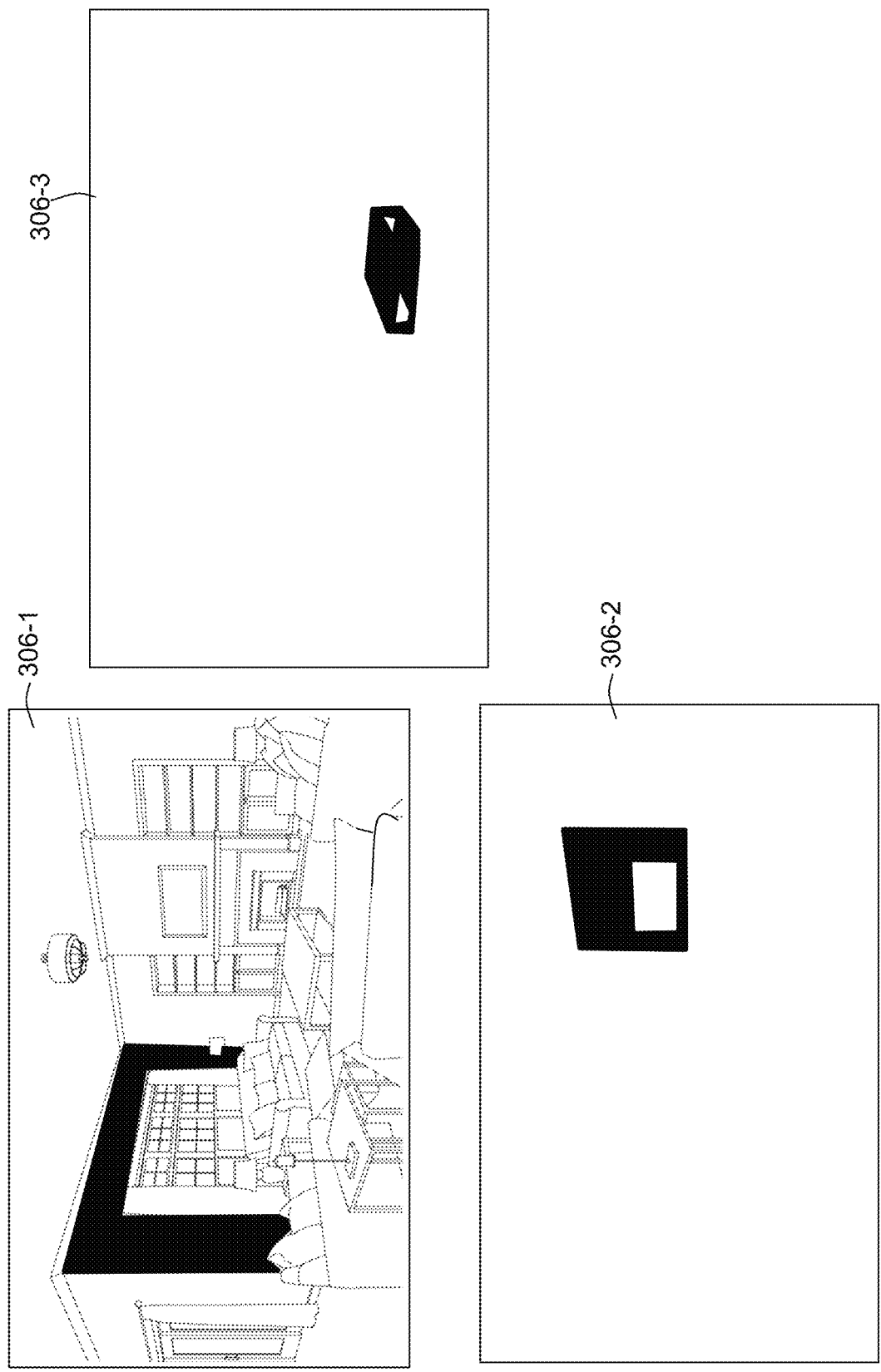
FIG. 7 is a mockup depicting tint plane mask images, according to an embodiment.

FIG. 7 depicts a representation of tint plane mask images 306-1, 306-2, and 306-3 that are associated with the recognized objects depicted in FIG. 6, with input image 202 depicted in juxtaposition with tint plane mask image 306-1.

Figure 8:
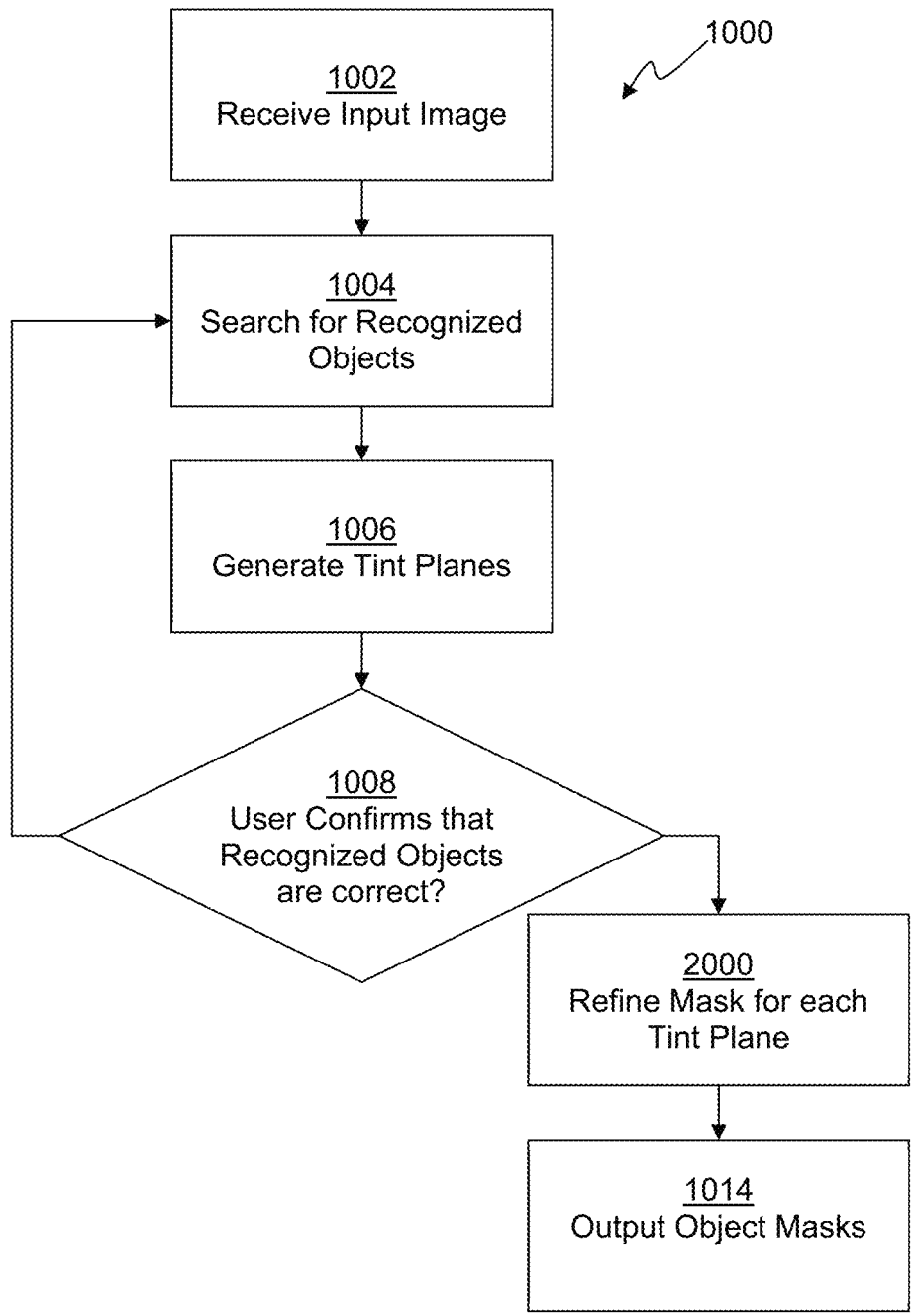
FIG. 8 is a flowchart depicting a method for generating object masks, according to an embodiment.

FIG. 8 is a flowchart depicting a method 1000 that can be executed to create object masks 302 based on input image 202. At 1002, the input image can be received, and a search for recognized objects can be initiated at 1004. In embodiments, at 1004, recognized objects can be searched for directly, or a first classifier can determine locations of recognized classes, before a series of second classifiers determines locations of the recognized objects.

At 1006, tint planes can be generated for each recognized object. At 1008, the user can, in embodiments, be queried to confirm that the appropriate objects were recognized. If the user indicates that one or more objects were not correctly identified, control can return to 1004 for updated search results. In embodiments, the user can also be presented with one or more deduced insights regarding the depicted scene. For example, the user can be asked to confirm that the input image depicts a specific interior or exterior architectural scene (for example, a kitchen). If the user indicates that the deduced scene was incorrectly identified, that information can be used as input to recognize the classes of objects within a scene.

At 2000, the probability map for each tint plane mask image can be determined, as depicted and described below with respect to FIG. 9. At 1012, object masks 302 representing each recognized object 304 can be output.

Figure 9:
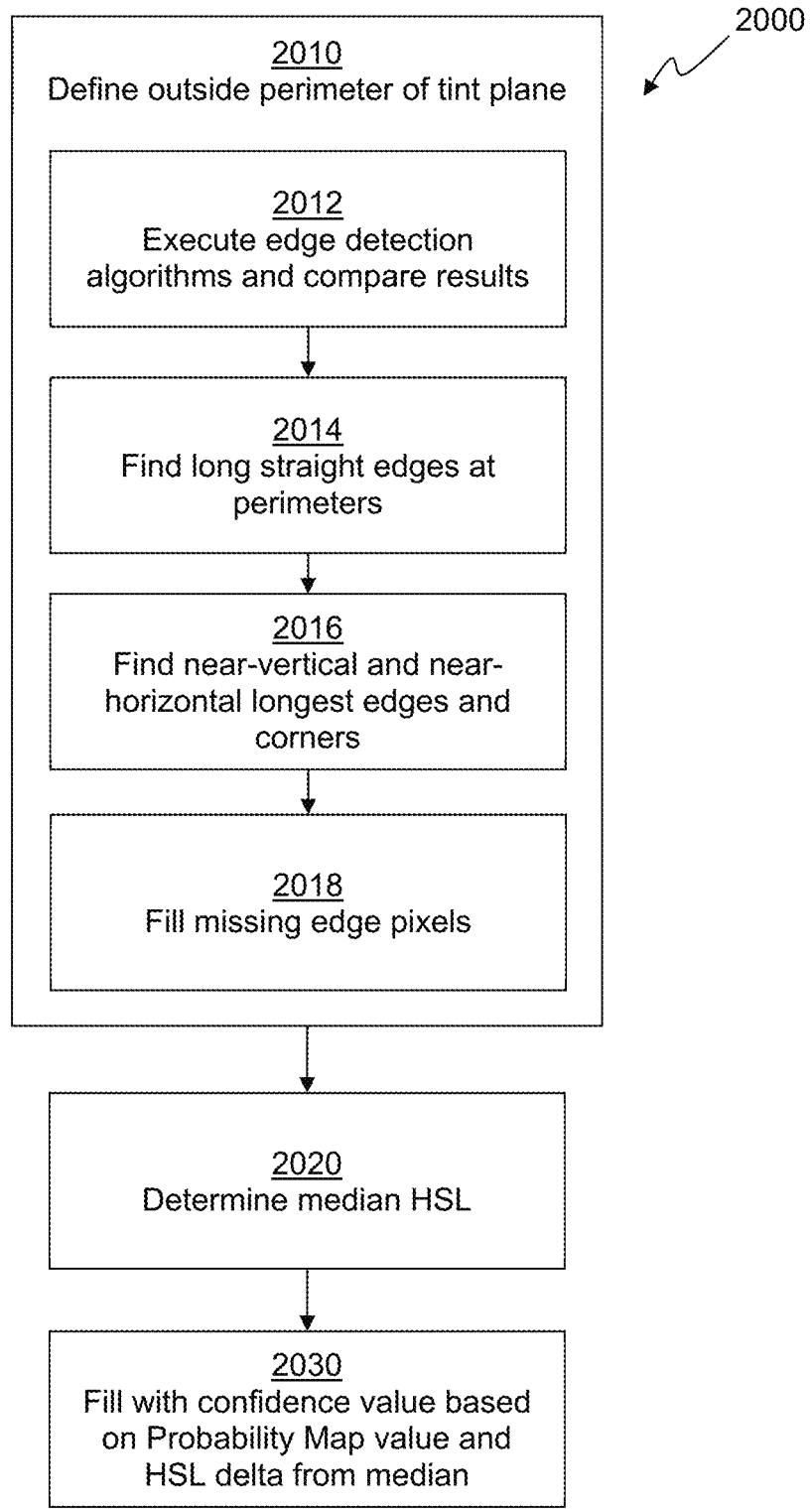
FIG. 9 is a flowchart depicting a method for generating a probability map, according to an embodiment.

FIG. 9 is a flowchart depicting a method 2000 for generating a probability map 308 for each recognized object 304, according to an embodiment. As discussed above, method 2000 can be executed or implemented as part of method 1000 for generating object masks 302.

At 2010, the contiguous outside perimeter boundary, or fence, of the tint plane 306 for a recognized object 304 can be determined by executing at least one edge detection algorithm and comparing the results at 2012, finding long straight edges at the perimeters at 2014, finding near-vertical and near-horizontal longest edges and corners at 2016, and filling missing edge pixels at 2018. More, fewer, or alternative algorithms can be executed to define the outside perimeter by embodiments.

At 2012, the edge detection algorithms can comprise edge detection algorithms known in the art such as canny edge detection, holistically-nested edge detection, and/or the like. The perimeter pixels determined by each edge detection algorithm can be compared to determine pixels that are assumed to be near the perimeter of the mask image. Each edge detection algorithm can be configured based on one or more thresholds. The edge detection thresholds can be predetermined and stored in a memory for use during execution of method 2000, or they can be updated based on feedback received during execution. Long straight lines that form the perimeters of polygonal recognized objects such as architectural surfaces and manufactured objects can also be detected.

At 2014, a feature extraction technique such as the Hough transform can be applied to selected sets of edge pixels in order to find long lines near the perimeter of the mask image. These lines can be used at 2014 to find near-vertical and near-horizontal edges and the corners of the perimeters at 2016. At 2018, the perimeter boundary of each tint plane can be completed by best-guess replacement of missing edge pixels.

At 2020, the median hue, saturation, and luminosity (HSL) values for each pixel in input image 202 that has a value greater than zero in the probability map for the recognized object 304 can be determined.

At 2030, the median HSL values can be used to fill areas of the probability map 308 using a flood-fill algorithm. The flood-fill algorithm can be a conventional algorithm, or a smart fill algorithm. The perimeter boundary of the tint plane 306 can be used as a fence, such that flood-fill operations will terminate when they reach a pixel one the perimeter boundary. Flood-fill operations can begin from pixels with a high score in the probability map 308, and the area that is filled can be capped by the strength of each pixel in the probability map 308 as well as other factors. Additional factors that can be used to determine whether to fill a location include the delta between the location's HSL value and the median HSL value for the tint plane. Further, instead of simply returning a binary value for whether a pixel is or isn't part of a tint plane 306, a weighted value for confidence can be returned. These weighted values can be used to improve the accuracy and fidelity of the rendering operations.

Figure 10:
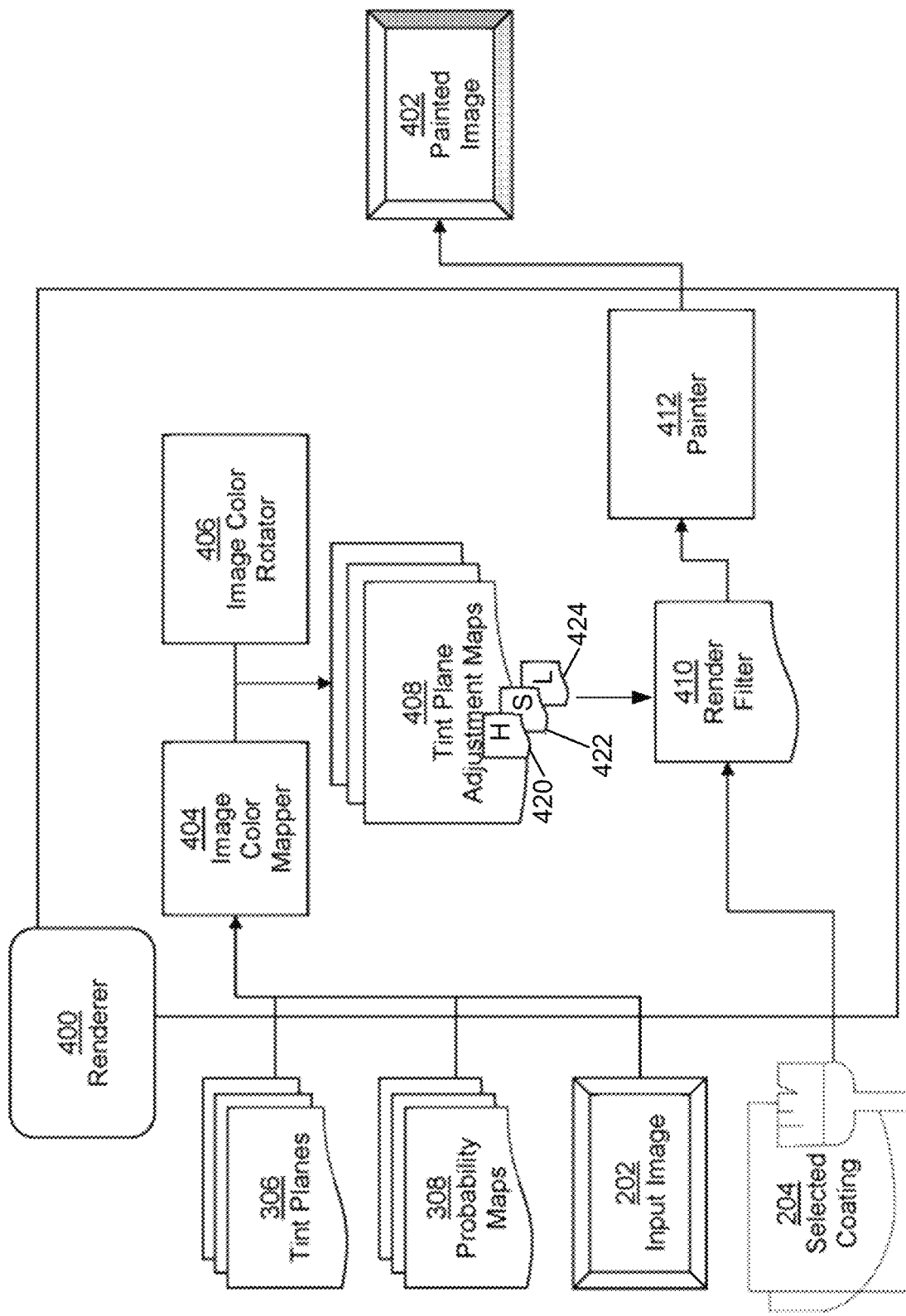
FIG. 10 is a schematic diagram depicting components of a renderer, according to an embodiment.
Figure 11:
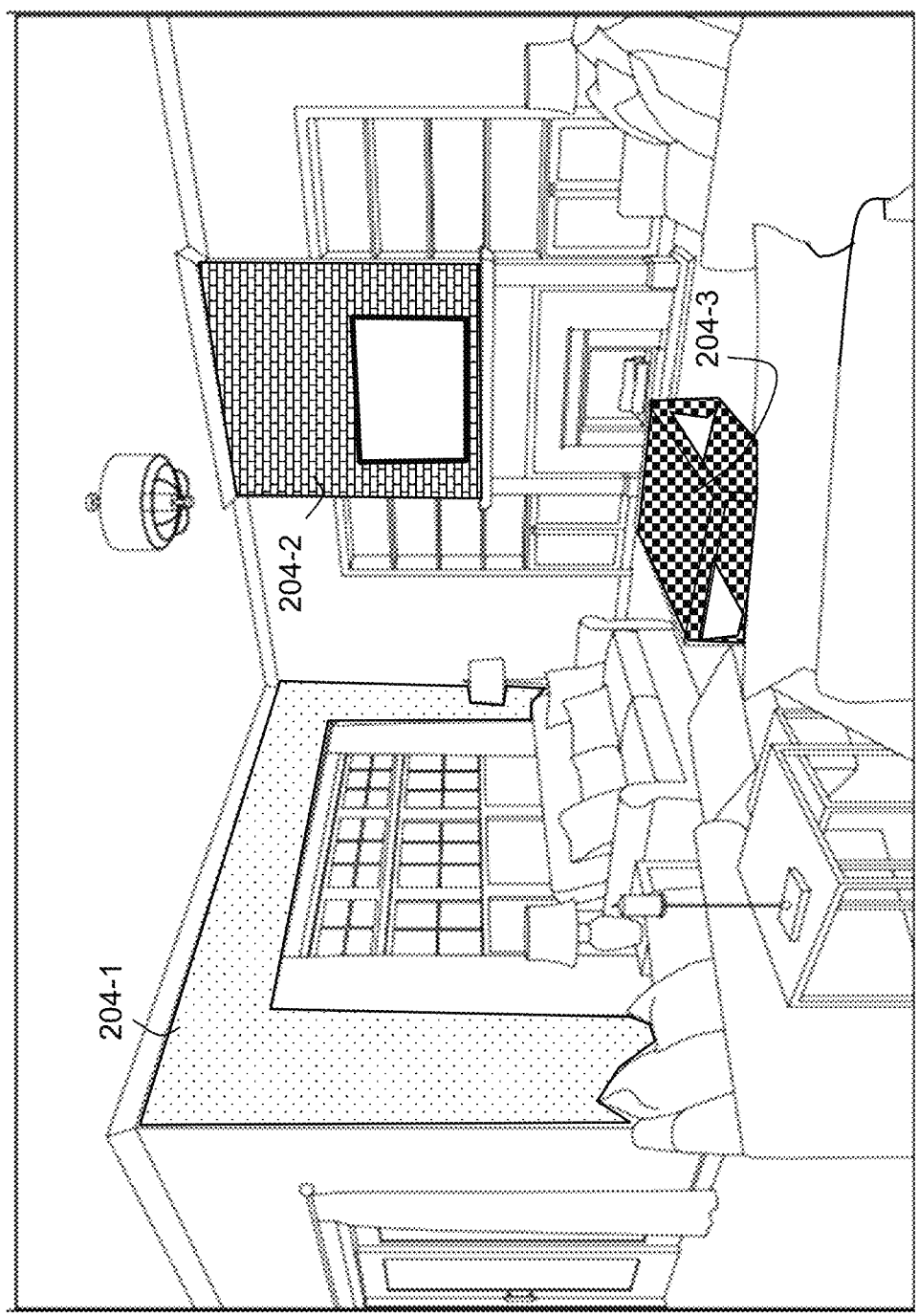
FIG. 11 is a mockup depicting an example painted image, according to an embodiment.

FIG. 10 is a schematic view depicting components of renderer 400, according to an embodiment. Renderer 400 can receive input image 202, object masks 302, and a selected coating 204 to apply to produce painted image, 402. FIG. 11 depicts an example painted image 402, in which regions corresponding to the recognized objects of the example depicted in FIG. 4 have been painted with a first selected coating 204-1, second selected coating 204-2, and third selected coating 204-3.

Returning to FIG. 10, image color mapper 404 can perform a first normalization of the pixels within the probability map 308 of each object mask 302, to determine a first luminosity adjustment to be made to each pixel of the probability map to normalize the lightness within a given recognized object. In a second normalization, image color mapper 404 can further determine a second luminosity adjustment to be made between the probability maps 308 of all of the object masks 302.

Image color rotator 406 can use the first and second luminosity adjustments to produce tint plane adjustment maps 408 for each tint plane 306. Each tint plane 306 can have one or more tint plane adjustment maps 408 defined. A hue map can identify regions of the object that contain the object's primary color (as identified by analysis of each pixel within the tint plane) and/or near-matches of the primary color. A highlight map can identify regions of the object that contain unusually luminous areas relative to the tine plan as a whole. Objects that are identified as being bright overall (such as an illuminated lamp) may not have a highlight map. A lightness normalization map can contain a lightness-adjusted version of the object bounded by the tint plane that is used as a foundation for applying a selected coating 204. An analysis performed on all tint planes can determine the target lightness value for the normalization of the object in relation to its peers. Each tint plane adjustment map 408 can be Base64 image data such as a binary image file comprising an scalable vector graphics (SVG) filter primitive, as defined by any version of the W3C Scalable Vector Graphics Specification, though other filter formats can be used.

The tint plane adjustment maps 408 can be combined with the selected coating 204 to create render filter 410, which can be a SVG filter. Those of ordinary skill in the arts will appreciate that multiple SVG filter primitives can be combined to define a composite SVG filter that can be applied to an input image. In an embodiment, render filter 410 can comprise a masked image, applying the same variations of hue 420, saturation 422, and luminosity 424 that were present in input image 202, but applied to the selected coating 204, in place of each object's primary color.

Painter 412 can be a client application configured to receive render filter 410, input image 202 and selected coating 204 to produce painted image 402 by overlaying each pixel of input image 202 with a painted pixel with values determined based on render filter 410 and selected coating 204. Painter 412 can comprise a web browser or other application configured to display on the screen of a user device and one or more client-side elements for interacting with and updating the document object model (DOM) as interpreted by the browser.

In embodiments, painter 412 can utilize the Canvas application programming interface (Canvas API). Canvas elements in HTML documents can provide instructions to a web browser or other HTML client-side interface to render an image with modifiers, such as render filter 410 and/or selected coating 204 applied. In embodiments, input image 202 can be provided as an ImageBitmap object within a Canvas element, and render filter 410 can be provided as one or more CanvasFilter objects within the canvas element.

FIGS. 12A and 12B are code listings depicting an example HTML markup that can be produced by painter 412 in one embodiment. As depicted, input image 202 is depicted as an image (img) element at line 1. Render filter 410 is defined at lines 4-15 as a filter element "filter_0." As depicted, render filter 410 includes selected coating 204 defined as a flat color feFlood element (line 5) and an feBlend element at line 14. Tint plane adjustment maps 408 are depicted as feImage elements (lines 6 and 7). Painted image 402 is depicted at lines 21-22 as an SVG element filtered by render filter 410, and masked by a mask image "mask_0" defined based on probability mask 408 such that only the tint plane pixels that meet a threshold confidence value are displayed over input image 202.

In one embodiment, tint planes 306, probability maps 308, and tint plane adjustment maps 408 can be generated on a server computing system. These can be generated a single time when input image 202 is first uploaded. These artifacts can be stored in a networked data store (such as a database or file system), or in embodiments can be stored on a client in HTML5 web storage. Painter 412 can comprise client-side components (such as JavaScript (React) code) that can generate HTML representing render filter 410 each time the user selects a different coating. The browser or other client-side applicant can then natively repaint the DOM to reflect the updated filters.

Figure 13:
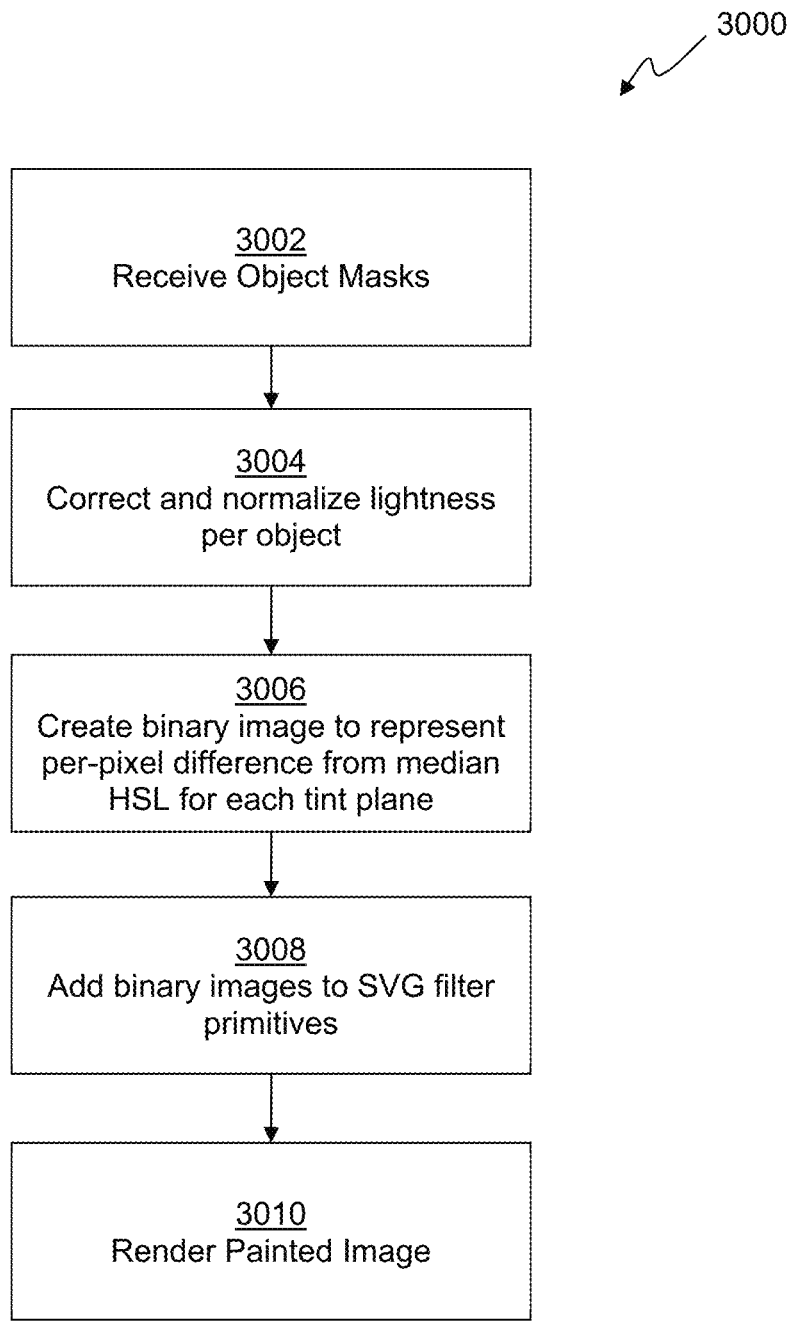
FIG. 13 is a flowchart depicting a method for rendering a painted image, according to an embodiment.

FIG. 13 depicts a method 3000 for rendering a painted image according to an embodiment. At 3002 the object masks 302, including tint planes 306 and probability maps 308 can be received. At 3004, lightness can be corrected and normalized per object. At 3006, binary images can be created to represent the per-pixel difference from the median HSL for each tint plane. At 3008, the binary images can be added to SVG filter primitives, which can be used at 3010 to render the painted image 402.

Figure 14:
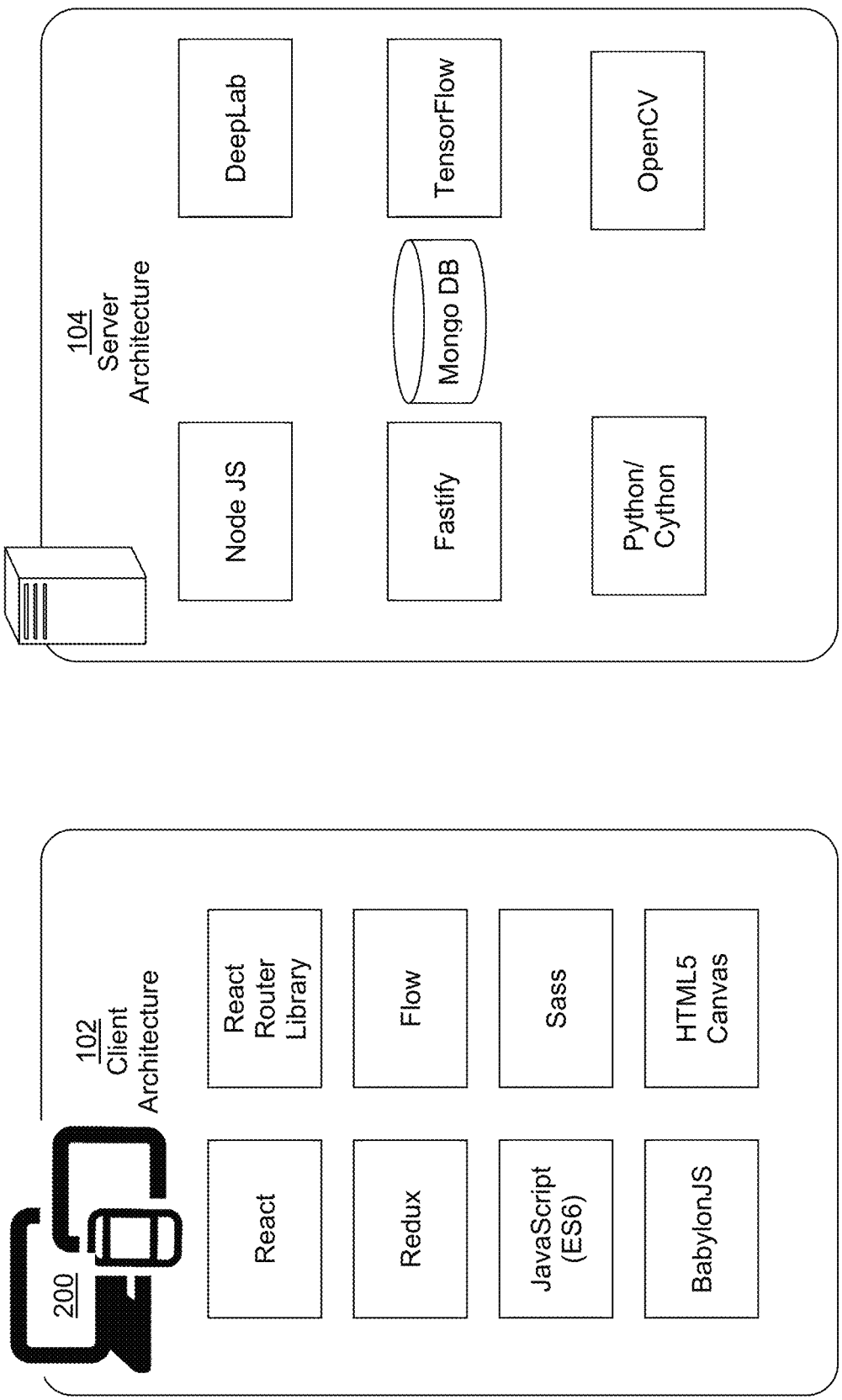
FIG. 14 is a schematic diagram depicting architectural elements of an image augmentation system, according to an embodiment.

System 100 can be implemented with, and hosted by, a client-server architecture. One such architecture that can be used according to an embodiment is in depicted FIG. 14. Client 102 can comprise a web application, or other application for execution on a computing device such as a person computer, mobile phone, tablet, or other device, and can implement or user interface 200 and house renderer 400. In embodiments, various components of client 102 can be generated or executed on a computing device associated with a user, while other components can be executed by an application server or other service providing computing system that is remote or separate from the user device. Embodiments of client 102 can be implemented in a version of JavaScript such as ECMAScript 6 (or ES6), as defined by the European Computer Manufacturers Association (Ecma) in the ECMA-262 and ISO/IEC 16262 standards, though other languages can be used. Client 102 can comprise a Flow static type checker, and execute within contexts provided by a Redux.js application container. User interface 200 can be provided, at least in part, via a React.js user interface library using Syntactically Awesome Style Sheets (Sass), with rendering provided through HTML5 Canvas with SVG Compound filters and BabylonJS and WebGL for two and three-dimensional rendering.

Server 104 can comprise one or more applications providing data and/or processing services to client 102 for execution on one or more computing systems. Server 104 can implement or house mask generator 300 in embodiments. Server 104 can be implemented using Node.js using a Fastify framework. Mask generator 300 can be implemented using DeepLab to define and execute Tensorflow models. Methods provided by the OpenCV framework can be used to improve and refine the image mask returned by machine learning models. Server 104 can further comprise a data store, such as a MongoDB, or other database.

While components or the entireties of client 102 and server 104 can be implemented and hosted across separate computing systems, any number of computing systems can be used in embodiments.

In one embodiment, the system 100 and/or its components or subsystems can include computing devices, microprocessors, modules and other computer or computing devices, which can be any programmable device that accepts digital data as input, is configured to process the input according to instructions or algorithms, and provides results as outputs. In one embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In one embodiment, volatile memory can include random access memory (RAM), dynamic random access memory (DRAM), or static random access memory (SRAM), for example. In one embodiment, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In one embodiment, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that embodiments may comprise fewer features than illustrated in any individual embodiment described above. The embodiments described herein are not meant to be an exhaustive presentation of the ways in which the various features may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Moreover, reference in the specification to "one embodiment," "an embodiment," or "some embodiments" means that a particular feature, structure, or characteristic, described in connection with the embodiment, is included in at least one embodiment of the teaching. The appearances of the phrase "in one embodiment" in various places in the specification are not necessarily all referring to the same embodiment.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

What is claimed is:

1. An image augmentation system for simulating an appearance of a coating to a surface of an original image comprising a plurality of original pixels, the system comprising:
   at least one memory and at least one processor configured to:
      receive the original image;
      perform a search to detect a plurality of recognized objects depicted in the original image, wherein the recognized objects include architectural elements and the at least one processor is configured to, as part of performing the search:
         identify an area of the original image that depicts an object in a class of objects; and
         search the area of the original image that depicts the object in the class of objects to identify boundaries of the object without searching an entire area of the original image to identify the boundaries of the object;
      generate object masks for the plurality of recognized objects, wherein for each of the plurality of recognized objects, the object mask for the recognized object comprises mask pixels corresponding to each of the plurality of original pixels, wherein for each respective mask pixel of the object mask for the recognized object, at least one parameter of the respective mask pixel has a first value if the original pixel corresponding to the respective mask pixel is part of the recognized object and a second value if the original pixel corresponding to the respective mask pixel is not part of the recognized object;
      implement a user interface configured to receive an identification of a selected object from among the plurality of recognized objects and an identification of the coating to be simulated on the selected object, and display a painted image; and
      generate the painted image that comprises a plurality of painted image pixels, wherein, for each respective painted image pixel of the plurality of painted image pixels:
         the respective painted image pixel has a painted color,
         the respective painted image pixel corresponds to one of the original pixels in the original image and also corresponds to one of the mask pixels in the object mask of the selected object, and
         the painted color of the respective painted image pixel is determined to be the same color as the original pixel that corresponds to the respective painted image pixel if the mask pixel that corresponds to the respective painted image pixel has the second value, and determined based on the coating if the mask pixel that corresponds to the respective painted image pixel has the first value.

2. The system of claim 1, wherein the at least one processor is configured to:
   apply a first neural network to identify the area of the original image that depicts the object; and
   apply a second neural network to search the area of the original image that depicts the object in the class of objects to identify the boundaries of the object.

3. The system of claim 1, wherein, for at least one painted image pixel of the plurality of painted image pixels, the at least one processor is configured to determine the painted color of the painted image pixel based on a tint plane adjustment map that defines a difference between a base color of the selected object and a color of the original pixel that corresponds to the painted image pixel.

4. The system of claim 3, wherein the difference between the base color of the selected object and the color of the original pixel that corresponds to the painted image pixel is based on at least one of a difference of a hue, a difference of a saturation, and/or a difference of a luminosity of the base color of the selected object and the color of the original pixel that corresponds to the painted image pixel.

5. The system of claim 3, wherein the coating and the tint plane adjustment map comprise filter primitives, and wherein the at least one processor is configured to generate the painted image by applying the filter primitives to the original image.

6. The system of claim 1, wherein, for at least one painted image pixel of the plurality of painted image pixels, the painted color of the painted image pixel is determined based on both the coating and a color of the original pixel that corresponds to the painted image pixel if the mask pixel that corresponds to the painted image pixel has the first value.

7. A method for simulating an appearance of a coating applied to a surface of an original image, the method comprising:
   receiving the original image, wherein the original image comprises a plurality of original pixels;
   performing a search to detect a plurality of recognized objects depicted in the original image, wherein the recognized objects include architectural elements;
   generating object masks for the plurality of recognized objects, wherein for each of the plurality of recognized objects, the object mask for the recognized object comprises mask pixels corresponding to each of the plurality of original pixels, wherein, for each respective mask pixel of the object mask for the recognized object, at least one parameter of the respective mask pixel has a first value if the original pixel corresponding to the respective mask pixel is part of the recognized object and a second value if the original pixel corresponding to the respective mask pixel is not part of the recognized object;

causing a user interface device to display a first painted image depicting the original image and a selectable area corresponding to each of the recognized objects;

receiving a user selection of a selected object from among the plurality of recognized objects;

receiving, from the user interface device, a user selection of the coating; and rendering a second painted image that comprises a plurality of painted image pixels including at least a first painted image pixel and a second painted image pixel, wherein:

each pixel of the second painted image has a painted color, the first painted image pixel corresponds to a first original pixel in the original image and also corresponds to a first mask pixel in the object mask of the selected object, the second painted image pixel corresponds to a second original pixel in the original image and also corresponds to a second mask pixel in the object mask of the selected object, based on the first mask pixel having the second value, the painted color of the first painted image pixel is determined to be the same color as the first original pixel, and based on the second mask pixel having the first value, the painted color of the second painted image pixel is determined based on the coating.

8. The method of claim 7, wherein performing the search to detect the plurality of recognized objects in the original image comprises identifying an area of the original image that depicts an object in a class of objects.

9. The method of claim 8, wherein performing the search to detect the plurality of recognized objects in the original image further comprises searching the area of the original image that depicts the object in the class of objects to identify boundaries of the object without searching an entire area of the original image to identify the boundaries of the object.

10. The method of claim 9, wherein identifying the area of the original image that depicts the object comprises:

applying a first neural network to identify the area of the original image that depicts the object; and applying a second neural network to search the area of the original image that depicts the object to identify the boundaries of the object.

11. The method of claim 7, further comprising, for at least one painted image pixel of the second painted image, determining the painted color of the painted image pixel based on a tint plane adjustment map that defines a difference between a base color of the selected object and a color of the original pixel that corresponds to the painted image pixel.

12. The method of claim 11, wherein the difference between the base color of the selected object and the color of the original pixel that corresponds to the painted image pixel is based on at least one of a difference of a hue, a saturation, and/or a luminosity of the base color of the selected object and the color of the original pixel that corresponds to the painted image pixel.

13. The method of claim 12, wherein the coating and the tint plane adjustment map comprise filter primitives, and wherein rendering the second painted image comprises applying the filter primitives to the original image.

14. The method of claim 7, wherein, for at least one painted image pixel of the plurality of painted image pixels, the painted color of the painted image pixel is based on both the coating and a color of the original pixel that corresponds to the painted image pixel.

* * * * *